(12) United States Patent
Markowski

(10) Patent No.: US 7,449,869 B2
(45) Date of Patent: Nov. 11, 2008

(54) DIGITAL CURRENT MODE CONTROLLER WITH LOW FREQUENCY CURRENT SAMPLING

(75) Inventor: Piotr Markowski, Worcester, MA (US)

(73) Assignee: Artesyn Technologies, Inc., Carlsbad, CA (US)

( * ) Notice: Subject to any disclaimer, the term of this patent is extended or adjusted under 35 U.S.C. 154(b) by 406 days.

(21) Appl. No.: 10/931,725

(22) Filed: Sep. 1, 2004

(65) Prior Publication Data

US 2006/0043954 A1  Mar. 2, 2006

(51) Int. Cl.
 G05F 1/00 (2006.01)
 G05F 1/565 (2006.01)
(52) U.S. Cl. ............ 323/283; 323/265; 323/266; 323/268; 323/271; 323/275; 323/282; 323/284; 323/285
(58) Field of Classification Search ............ 323/283, 323/265–285
See application file for complete search history.

(56) References Cited

U.S. PATENT DOCUMENTS

| | | | |
|---|---|---|---|
| 5,523,676 A | 6/1996 | Bach et al. | |
| 5,594,631 A | 1/1997 | Katoozi et al. | |
| 6,005,377 A | 12/1999 | Chen et al. | |
| 6,020,729 A | 2/2000 | Stratakos et al. | |
| 6,100,676 A | 8/2000 | Burstein et al. | |
| 6,115,266 A | 9/2000 | Matsui et al. | |
| 6,169,669 B1 | 1/2001 | Choudhury | |
| 6,181,123 B1 | 1/2001 | Jou et al. | |
| 6,198,261 B1 | 3/2001 | Schultz et al. | |
| 6,204,650 B1 * | 3/2001 | Shimamori | 323/283 |
| 6,225,795 B1 | 5/2001 | Stratakos et al. | |
| 6,268,716 B1 | 7/2001 | Burstein et al. | |
| 6,351,108 B1 | 2/2002 | Burstein et al. | |
| 6,445,244 B1 | 9/2002 | Stratakos et al. | |
| 6,590,369 B2 | 7/2003 | Burstein et al. | |
| 6,850,046 B2 | 2/2005 | Chapuis | |
| 6,853,169 B2 | 2/2005 | Burstein et al. | |

(Continued)

OTHER PUBLICATIONS

D. Maksimovic, R. Zane, R. Erickson, "Impact of digital control in power electronics," *IEEE International Symposium on Power Semiconductor Devices & ICs*, Kitakyushu, Japan, May 2004, pp. 13-22.

(Continued)

*Primary Examiner*—Akm Enayet Ullah
*Assistant Examiner*—Richard V Muralidar
(74) *Attorney, Agent, or Firm*—K&L Gates LLP

(57) ABSTRACT

The present invention is directed to a digital controller for adjusting the duty ratio a pulse width modulation control signal used to control a power switch of a switch mode power converter. According to various embodiments, the digital controller comprises a voltage compensator module for generating a first signal (Dvoltage) representative of the duty ratio of the control signal based on a difference between an output voltage of the converter and a reference voltage. The controller also includes a current compensator module for generating a second signal (Dcorrection) representative of a modification to the duty ratio of the control signal based on an output current of the converter. A subtraction module subtracts the second signal (Dcorrection) from the first signal (Dvoltage) to thereby generate a third signal (D), which is used by a duty ratio PWM generator module to generate the pulse width modulation control signal with the appropriate duty ratio.

14 Claims, 4 Drawing Sheets

U.S. PATENT DOCUMENTS

| | | | |
|---|---|---|---|
| 6,862,198 | B2 | 3/2005 | Muegge et al. |
| 6,873,140 | B2 * | 3/2005 | Saggini et al. ............... 323/283 |
| 2002/0001204 | A1 | 1/2002 | Lentini et al. |
| 2002/0105307 | A1 | 8/2002 | Groeneveld et al. |
| 2004/0052098 | A1 | 3/2004 | Burstein et al. |
| 2004/0178776 | A1 | 9/2004 | Hansen et al. |
| 2004/0189264 | A1 | 9/2004 | Matsuura et al. |
| 2004/0189272 | A1 | 9/2004 | Matsuura et al. |
| 2005/0012492 | A1 | 1/2005 | Mihalka |
| 2006/0001408 | A1 * | 1/2006 | Southwell et al. ........... 323/282 |

OTHER PUBLICATIONS

B.J. Patella, A. Prodic, A. Zirger, D. Maksimovic, "High-frequency digital PWM controller IC for DC-DC converters," *IEEE Transactions on Power Electronics*, vol. 18, No. 1, Jan. 2003, pp. 438-446.

A.V.Peterchev, J. Xiao, S.R. Sanders, "Architecture and IC implementation of a digital VRM controller," *IEEE Transactions on Power Electronics*, vol. 18, No. 1, Jan. 2003, pp. 356-364.

J.Chen, A.Prodic, R.Erickson, D.Maksimovic, "Predictive digital current programmed control," *IEEE Transactions on Power Electronics*, vol. 18, No. 1, Jan. 2003, pp. 411-419.

S.Bibian, H.Jin, "High performance predictive dead-beat digital controller for DC power supplies," *IEEE Transactions on Power Electronics*, vol. 17, No. 3, May 2002, pp. 420-427.

S. Bibian and H. Jin, "Digital control with improved performances for boost power factor correction circuits", *Proc. IEEE Apec'01*, 2001, pp. 137-143.

D. Sprock and P. Hsu, "Predictive discrete time control of switch-mode applications," *IEEE Power Electron. Spec. Conf.*, vol. 1, 1997, pp. 175-181.

T. Koga, H. Hayashi, M. Nakano, and V. Saechout, "Dead beat control for PWM inverter," *Proc. IEEE Ind. Electron. Conf.*, 1994, pp. 549-554.

A.V.Peterchev, S.R. Sanders, "Quantization resolution and limit cycling in digitally controlled PWM converters," *IEEE Transactions on Power Electronics*, vol. 18, No. 1, Jan. 2003, pp. 301-308.

H. Peng, A. Prodic, E. Alarcon, D. Maksimovic, "Modeling of quantization effects in digitally controlled dc-dc converters," *IEEE PESC*, 2004, pp. 4312-4318.

* cited by examiner

DIGITAL CURRENT MODE CONTROLLER WITH LOW FREQUENCY CURRENT SAMPLING

BACKGROUND

1. Field of the Invention

The present invention generally concerns electronic power conversion circuits and, more particularly, concerns current mode control circuits for power converters.

2. Background of the Invention

Current mode control schemes for power converters provide numerous advantages over other control schemes. These advantages include good dynamic behavior with a simple compensation network, rejection of the disturbance caused by the input voltage, inherent pulse-by-pulse overcurrent protection, and ease of implementation of current sharing. FIG. 1 is a diagram of a power converter 10, in this case a buck converter, with a conventional analog current mode control circuit 12. The power switch 14 of the buck converter 10 is turned on by the pulse created by the clock 16 of the current mode control circuit and turned off when the signal of the current monitor 18 exceeds the threshold level programmed by the voltage feedback loop compensator 20 via a flip-flop 22. This type of control scheme is known as peak current mode control. Numerous variations of such analog peak current mode control circuits are known and used throughout the power conversion industry.

Technological progress on both the demand side and the supply side, however, creates significant incentive to implement increasing portions of the controller with digital circuitry. Digital circuitry provides the advantages of programmability, stability, noise immunity and ability to implement complex timing and signal processing operations. In that connection, economies of engineering naturally entice designers to replicate the analog structure and techniques that work well in analog technology with digital circuitry. The straightforward replication of the analog current mode control circuit 12 of FIG. 1 with digital means, as shown in FIG. 2, however, leads to serious difficulty. In the digital current mode control circuit 24 of FIG. 2, the temporal resolution achievable is dictated by the repetition rate of the sampling and A/D conversion circuitry 26. Resolution necessary to suppress quantization noise to a level that does not have a detrimental effect on the overall performance of the power converter 10 implies sampling every few nanoseconds for typical point-of-load (POL) converters and perhaps as low as one nanosecond for high performance designs. A/D converters capable of meeting such requirements are prohibitively expensive for most applications. Also, operating an A/D converter with a low sampling frequency leads to a phenomenon known as limit cycle oscillation, which in turn introduces complex, non-linear oscillations of the output voltage. These oscillations are typically bounded in nature and may be acceptable for some applications. In some cases, however, they cause an interaction with the voltage control loop. The non-linear nature of limit cycle oscillation that causes such interaction is difficult to analyze and, as such, compromises the reliability of the converter.

Accordingly, there exists a need for a digital current mode control circuit that can operate at low sampling frequencies without experiencing the drawbacks associated with limit cycle oscillation.

SUMMARY

In one general aspect, the present invention is directed to a digital current mode controller for adjusting the duty ratio of a pulse width modulation control signal used to control a power switch of a switch mode power converter. According to various embodiments, the digital controller comprises a voltage feedback loop compensator module for generating a first signal (referred to herein as "Dvoltage") representative of the duty ratio of the control signal based on a difference between an output voltage of the converter and a reference voltage. The controller also includes a current feedback loop compensator module for generating a second signal (referred to herein as "Dcorrection") representative of a modification to the duty ratio of the control signal based on the current of the output inductor of the converter. A subtraction module subtracts the second signal (Dcorrection) from the first signal (Dvoltage) to thereby generate a third signal (D), which is used by a duty ratio PWM generator module to generate the pulse width modulation control signal with the appropriate duty ratio.

According to various implementations, the voltage compensator module may adjust a frequency characteristic of a signal (herein referred to as "Verror") representative of the difference between the reference voltage and the output voltage of the converter. Additionally, the transfer function of the current compensator module may be a proportionality factor with no frequency or time dependence. Also, the current of the output inductor may be sampled at a relatively low frequency, such as once every switching cycle of the converter.

The controller, according to various embodiments, may provide dynamic properties similar to peak current mode control even though information about the instantaneous value of the current of the output inductor is not continuously available. Moreover, the frequency characteristic of the voltage compensator module may be designed with a method essentially similar to conventional current mode control. These and other benefits of the present invention will be apparent from the description below.

DESCRIPTION OF THE FIGURES

Various embodiments of the present invention are described herein by way of example with reference to the following figures, wherein.

DETAILED DESCRIPTION

Figure 1:
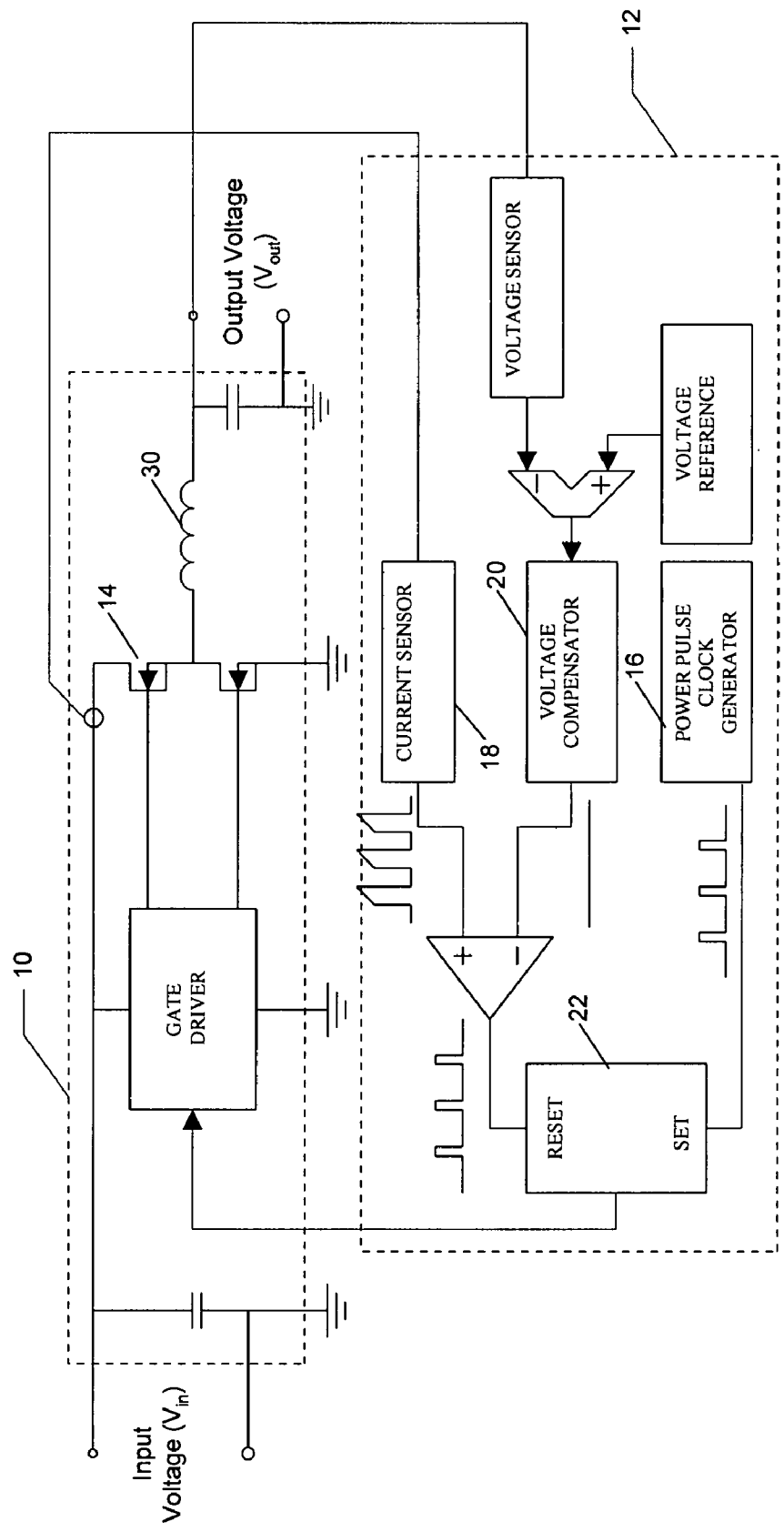
FIG. 1 is a diagram of a power converter with a prior art analog current mode control circuit.
Figure 2:
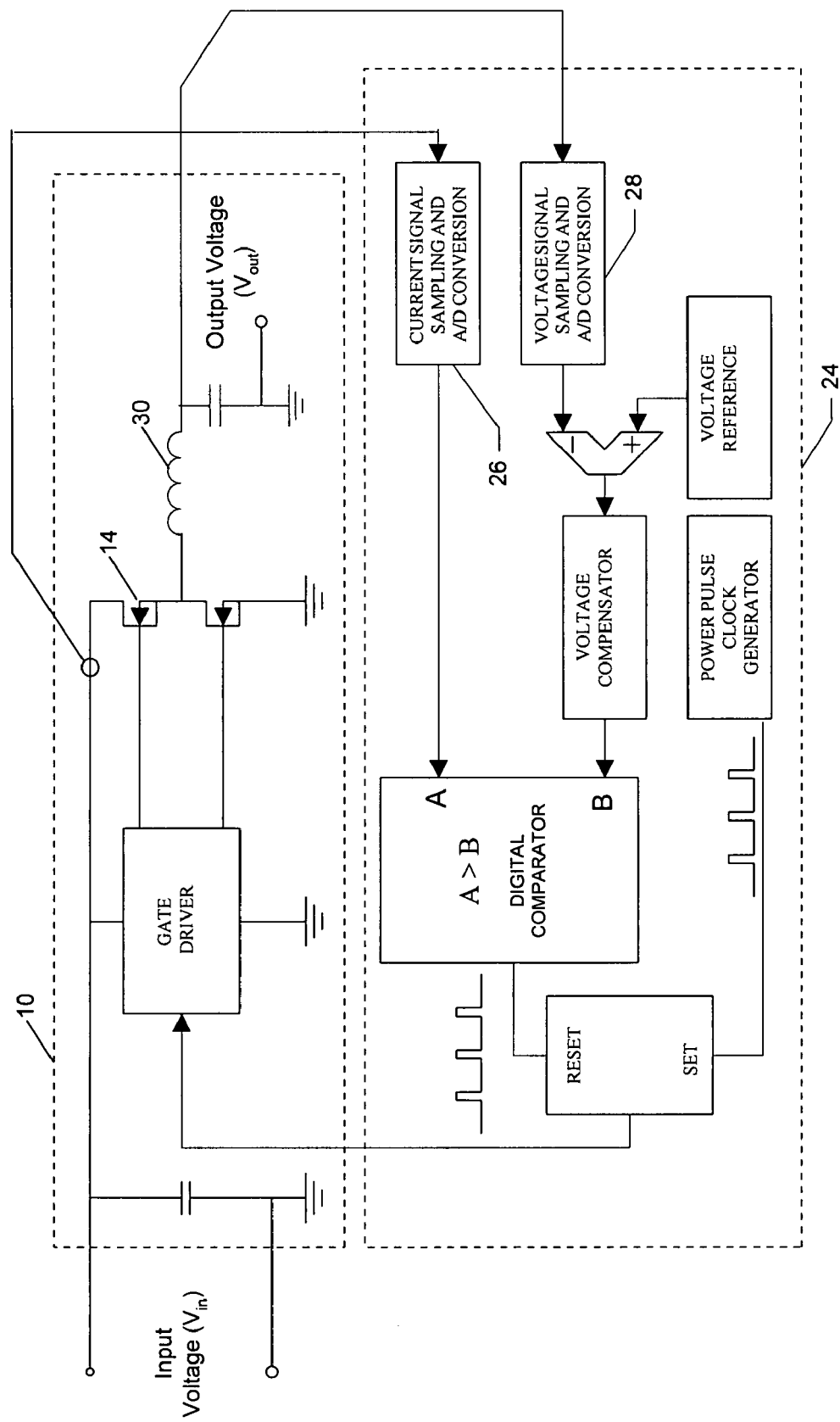
FIG. 2 is a diagram of a power converter with straightforward digital replication of the analog current mode control circuit of FIG. 1.
Figure 3:
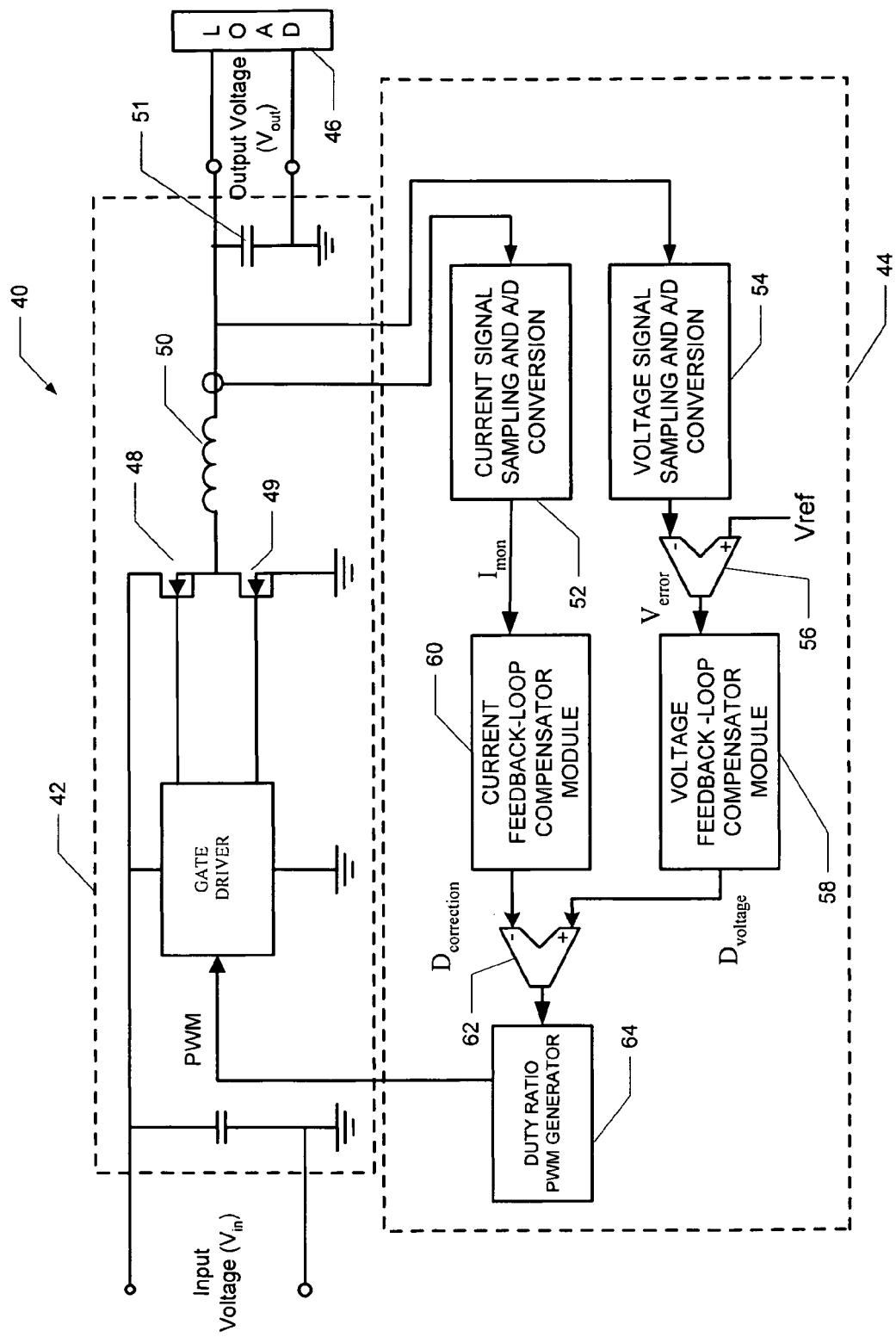
FIG. 3 is a diagram of a power converter with a digital current mode control circuit according to various embodiments of the present invention.

FIG. 3 is a diagram of a power converter 40 according to various embodiments of the present invention. The converter 40 includes a power processing circuit 42 and a controller 44. The power processing circuit 42 is for converting in input voltage (Vin) to an output voltage (Vout) for powering a load 46. In the embodiment of FIG. 3, the power processing circuit 42 is implemented as a single phase buck converter, although according to various other embodiments, different switch module converter topologies for the power processing circuit 42 may be used, such as a multiphase buck converter, a boost converter, a buck-boost converter, a cuk converter, their isolated derivatives, or combinations thereof. The operation of a single-phase buck converter is well known and, therefore, not further described herein. The load 46 may be any electronic circuit requiring regulated power, such as computer equipment, telecommunications equipment, instrumentation, etc.

The controller 44, according to various embodiments, may use a digital feedback loop to output one or more control signals (PWM) that are used to control the power switches 48, 49 of the power processing circuit 42. The controller 44 may vary the duty cycle of the control signal to thereby control the ratio of the on and off times of the power switch 48 to thereby regulate the output voltage to keep the output voltage as close as possible to a desired level. The controller 44 may vary the duty cycle of the control signal based on an error signal (Verror) indicative of the difference between the reference voltage (Vref) and the output voltage. The reference voltage may be constant (in which case the output voltage is kept constant) or may follow a desired reference that can be altered by supervisory circuitry (not shown) depending on the optimal operating point of the load. The controller 44 adjusts the duty cycle of the control signal PWM to reduce or null the error signal.

Due to the dynamic properties of energy storage components of the power processing circuit 42, like the inductor 50 and the output capacitor 51, modifying the duty cycle proportionally to the magnitude of the voltage error signal does not always provide satisfactory performance. Accordingly, the controller 44, as described in more detail below, may adjust the frequency characteristic of the error signal. In addition, the controller also uses information about the current of the output inductor 50 of the power processing circuit 42 to control the duty cycle. This allows, according to various embodiments, the use of the same compensation techniques as used in conventional analog current mode control, even though the information about the amplitude of the output current is available only at discrete points in time. This, in turn, allows the realization of the advantageous properties of current mode control, including good dynamic behavior, rejection of the disturbance caused by the input voltage, inherent pulse-by-pulse overcurrent protection and ease of implementation of current sharing.

Using a digital feedback loop, as shown in FIG. 3, the controller 44 may include a current signal sampling and A/D conversion module 52 and a voltage signal sampling and A/D conversion module 54. The voltage signal sampling and A/D conversion module 54 samples the output voltage (Vout) of the power processing circuit 42 and converts it to a digital signal. This digital signal is subtracted from the reference voltage by a subtraction module 56, which produces the error signal (Verror) indicative of the difference between the desired voltage level and the actual output voltage.

The error signal (Verror) is input to a voltage feedback loop compensator module 58 (also referred to herein as the "voltage compensator module 58"). According to various embodiments, the voltage compensator 58 may adjust the frequency characteristic of the error signal to achieve the objectives of the converter as deemed appropriate for its given application, including, for example, maximum acceptable deviation of the output voltage under a specified disturbance, time needed to return to equilibrium after the disturbance, non-oscillatory response, etc. The transfer function of the voltage compensator 58 can be any transfer function pertaining to current mode control, such as described in Robert W. Erickson, Dragan Maksimovic, "Fundamentals of Power Electronics", Kulver Academic Publishers, 2001, Chapter 12, 439-489, which is incorporated herein by reference. The output signal of the voltage compensator 58 is shown as Dvoltage in FIG. 3 and corresponds to the frequency characteristic-adjusted version of the error signal (Verror).

The current signal sampling and A/D conversion module 52 samples the current of the output inductor 50 of the power processing circuit 42, and converts it to a digital signal Imon. The Imon signal is input to a current feedback loop compensator module 60 (also referred to herein as the "current compensator module 60") to produce a signal, Dcorrection, representing the correct to the Dvoltage signal derived from the output current information. A subtraction module 62, therefore, subtracts the Dcorrection signal from the Dvoltage signal to thereby generate a signal D indicative of the appropriate duty ratio for the PWM control signal. The D signal is input to a duty ratio PWM generator 64 which generates the PWM signal for controlling the power switches 48, 49 of the power processing circuit 42 where the duty ratio of the pulses of the PWM signal are proportional to the D signal.

The transfer function of the current compensator 60 preferably is a proportionality factor, without any frequency or time dependence, which makes its optimization relatively simple. In another embodiment, the transfer function of the current compensator 60 may include a frequency dependent component to complement the transfer function of the voltage compensator 58.

Figure 4:
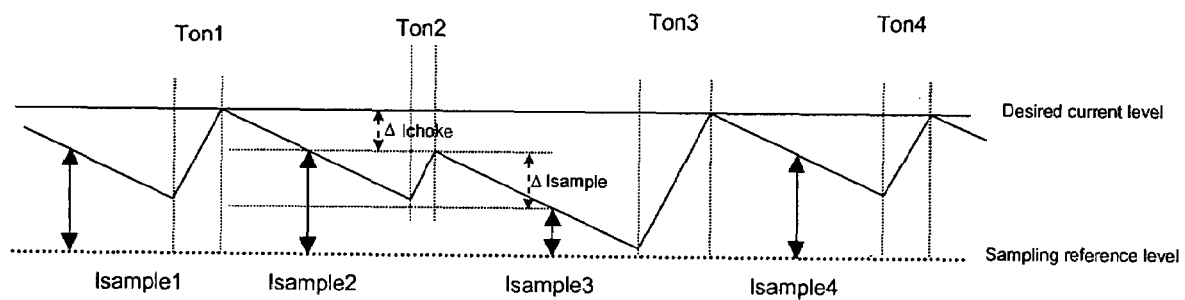
FIG. 4 illustrates an example of the output current waveform of the converter according to various embodiments of the present invention.

By judicious selection of the gain of the current compensator 60, operation analogous to current mode can be achieved. This means that the current in the inductor 50 may follow the value commanded by the voltage compensator 58. The principle of operation and method of selecting the gain of the current compensator 60 according to various embodiments is explained with the aid of FIG. 4. The double-sided vertical arrows in FIG. 4 depict the amplitude of the inductor current at various sample times and Ton is the on-time of the periodic power pulses (on time of the power switch 48). As can be seen in this figure, the sampling rate of the current signal may be as low as once per cycle, which may be on the order of once every 2 microseconds for a converter operating at 500 kHz.

Prior to Ton1 the converter 40 is assumed to be in equilibrium. Reduction of the second on-time (Ton2) in FIG. 4, resulting in the inductor current diving below by ΔIchoke represents a disturbance to the system. This type of disturbance is conducive to a depiction of the underlying principle but the same mechanism may apply for other causes of such an imbalance (such, for example, due to the adjustments caused by the voltage compensator 58).

The presence and magnitude of the disturbance is detected at the moment when the next (third) sample, Isample3, is taken. ΔIsample represents the difference between the last current sample and the immediately preceding sample. ΔIsample may be used to generate a change in the duty cycle, by the Dcorrection signal, to bring the inductor current back to the desired level in one switching cycle. That is, the current compensator 60 may attempt to adjust the duty cycle such that the inductor current at sample 4 (Isample4) is similar to sample 2 (Isample2) thus rejecting distortion detected in sample 3. According to various embodiments, the current compensator 60 need not compute the difference between Isample3 and Isample2. Rather, the correction signal Dcorrection may by an appropriately scaled version of Isample since the voltage compensator 58 may have the ability to reject fixed disturbances (assuming the transfer function of the voltage compensator 58 has an integrating property, which is common for current mode control). If the transfer function of the current compensator 60 contains only a fixed gain, the result resembles conventional peak current mode control. If an integrating function is added to the current compensator 60, an average current control can be achieved.

According to one embodiment, the gain of the current compensator 60 may be determined based on the design consideration that the change in the inductor current represented by ΔIsample must cause a change in the duty cycle D such that the original value of Isample is restored. The change in the duty cycle, Dcorrection, may be determined by:

$$Dcorrection = Ichoke \times K_{IAD} \times K_{CC}$$

where $K_{IAD}$ is the gain of the current sampling and A/D conversion module 52 and $K_{CC}$ is the gain of the current compensator 60. The original value of Isample is restored if:

$$Ichoke = Dcorrection \times T \times (Vin - Vout) \times 1/L_{choke}$$

where T is the switching cycle period and $L_{choke}$ is the inductance of the output inductor 50. Hence, the gain of the current compensator 60 may be determined by:

$$K_{CC} = \frac{L_{choke}}{K_{IAD} \cdot T \cdot (Vin - Vout)}$$

The controller 44 may be implemented with fixed and/or programmable digital logic devices. For programmable modules of the controller 44, the modules may be implemented as software code to be executed by a processor (not shown) of the controller 44 using any type of suitable instruction type. The code may be stored as a series of instructions or commands on a computer readable medium (not shown), such as a random access memory (RAM) or a read only memory (ROM). Also, various modules of the controller may be implemented as programmable logic devices, such as, for example, field programmable gate arrays (FPGAs) and/or complex programmable logic devices (CPLDs). For fixed logic modules, the logic of the module(s) may be implemented in, for example, an application specific integrated circuit (ASIC).

According to various embodiments, the present invention is also directed to a method for modifying a duty cycle of a pulse width modulated control signal used to control a power switch of a switch mode converter. The method may include the steps of, as described above, (i) generating a first signal (Dvoltage) representative of a duty ratio of the control signal based on a difference between a reference voltage and a signal representative of the sampled output voltage of the converter and, (ii) generating a second signal (Dcorrection) representative of a modification to the duty ratio of the control signal based on a signal representative of the current of the output inductor of the converter, (iii) generating a third signal (D) representative of the second signal subtracted from the first signal, and (iv) generating the duty ratio of the control signal proportional to the third signal (D). As described above, the Dvoltage signal may be generated by adjusting a frequency characteristic of the Verror signal. Also, the Dcorrection signal may be generated by applying a gain factor, with no frequency or time dependence, to the signal representative of the sampled current of the output inductor of the converter.

Although the present invention has been described herein with respect to certain embodiments, those of ordinary skill in the art will recognize that many modifications and variations of the present invention may be implemented. For example, the power processing circuit 42 may employ a different topology than the single-phase synchronous buck converter shown in FIG. 3. The foregoing description and the following claims are intended to cover all such modifications and variations.

What is claimed is:

1. A power converter comprising:
    a power processing circuit including at least one pulse width modulated power switch;
    a digital current-mode controller for generating a control signal used to control the power switch of the power processing circuit, wherein the digital controller is for modifying the duty ratio of the control signal, and wherein the digital controller includes;
        a voltage sampling and A/D converter connected to the output of the power processing circuit for sampling the output voltage of the power processing circuit and converting the sampled output voltage to digital values;
        a voltage feedback loop compensator module connected to the voltage sampling and A/D converter for generating a first signal representative of a duty ratio of the control signal by adjusting a frequency characteristic of a signal representative of a difference between (1) the sampled and A/D converted digital values of the output voltage of the converter and (2) a reference voltage;
        a current signal sampling and A/D converter connected to an output inductor of the power processing circuit for sampling the current of the output inductor and converting the sample current to digital values;
        a current feedback loop compensator module in communication with the low frequency current signal sampling and ND converter for generating a second signal representative of a modification to the duty ratio of the control signal based on the sampled and A/D converted digital values of the current of an output inductor of the converter;
        a subtraction module for generating a third signal representative of the second signal subtracted from the first signal; and
        a duty ratio PWM generator module for generating the control signal having a duty ratio proportional to the third signal.

2. The power converter of claim 1, wherein a transfer function of the current feedback loop compensator module includes a proportionality factor without any frequency or time dependence.

3. The power converter of claim 2, wherein the proportionality factor is directly related to the inductance of the output inductor of the power processing circuit.

4. The power converter of claim 3, wherein the proportionality factor is inversely related the switching cycle period of the converter.

5. The power converter of claim 1, wherein the current signal sampling and A/D converter is for sampling the current of the output inductor of the converter once every cycle of the converter.

6. A digital current-mode controller for generating a control signal used to control a power switch of a switch mode converter, wherein the digital controller is for modifying a duty ratio of the control, the digital controller comprising:
    a voltage sampling and A/D converter connected to the output of the power processing circuit for sampling the output voltage of the switch mode converter and converting the sampled output voltage to digital values;
    a voltage feedback loop compensator module connected to the voltage sampling and A/D converter for generating a first signal representative of a duty ratio of the control signal by adjusting a frequency characteristic of a signal representative of a difference between (1) the sampled and A/D converted digital values of the output voltage and (2) a reference voltage;

a current signal sampling and A/D converter connected to an output inductor of the switch mode converter for sampling the current of the output inductor and converting the sample current to digital values;

a current feedback loop compensator module connected to the current signal sampling and A/D converter for generating a second signal representative of a modification to the duty ratio of the control signal based on a the sampled and A/D converted digital values of the output inductor current of, wherein a transfer function of the current feedback loop compensator module includes a proportionality factor;

a subtraction module for generating a third signal representative of the second signal subtracted from the first signal; and a duty ratio PWM generator module for generating the control signal for controlling the power switch of the converter, wherein the duty ratio of the control signal is proportional to the third signal.

7. The controller of claim 6, wherein the transfer function of the current compensator feedback loop module includes a proportionality factor without any frequency or time dependence.

8. The controller of claim 6, wherein the current sampling module and A/D conversion module is for sampling the current of the output inductor of the converter once every cycle of the converter.

9. A method for modifying a duty cycle of a pulse width modulated control signal used to control a power switch of a switch mode converter comprising:

sampling the output voltage of the switch mode converter;

converting the sampled output voltage to digital values;

generating a first signal representative of a duty ratio of the control signal by adjusting a frequency characteristic of a signal representative of a difference between (1) a reference voltage and (2) the sampled and A/D converted digital values of the output voltage of the converter;

sampling the current of an output inductor of the switch mode converter;

converting the sampled output inductor current to digital values;

generating a second signal representative of a modification to the duty ratio of the control signal based on a signal that is proportionally related to the sampled and A/D converted digital values of the output inductor current;

generating a third signal representative of the second signal subtracted from the first signal; and generating the duty ratio of the control signal proportionally to the third signal.

10. The method of claim 9, wherein generating the second signal includes applying a gain factor to the signal representative of the sampled current of the output inductor of the converter.

11. The method of claim 9, wherein sampling the current includes sampling the current of the output inductor of the converter once every cycle of the converter.

12. A digital current-mode controller for generating a control signal used to control a power switch of a switch mode converter, wherein the digital controller is for generating a duty ratio of the control signal to achieve a desired output voltage from the converter, the digital controller comprising:

a voltage sampling and A/D converter connected to the output of the power processing circuit for sampling the output voltage of the switch mode converter and converting the sampled output voltage to digital values;

means, connected to the voltage sampling and A/D converter, for generating a first signal representative of a duty ratio of the control signal by adjusting a frequency characteristic of a signal representative of a difference between (1) the sampled and A/D converted digital values of the output voltage and (2) a reference voltage;

a current signal sampling and A/D converter connected to an output inductor of the switch mode converter for sampling the current of the output inductor and converting the sample current to digital values;

means, connected to the current signal sampling and A/D converter, for generating a second signal representative of a modification to the duty ratio of the control signal based on a the sampled and A/D converted digital values of the output inductor current, wherein a transfer function of the means for generating the second signal includes a proportionality factor;

means for generating a third signal representative of the second signal subtracted from the first signal; and means for generating the control signal for controlling the power switch of the converter, wherein the duty ratio of the control signal is proportional to the third signal.

13. The controller of claim 12, wherein the means for generating the second signal includes applying a gain factor to a signal representative of the sampled and A/D converted digital values of the output inductor current.

14. The controller of claim 12, wherein the current signal sampling and A/D converter is for sampling the current of output inductor of the converter once every cycle of the converter.

* * * * *

UNITED STATES PATENT AND TRADEMARK OFFICE
CERTIFICATE OF CORRECTION

PATENT NO.         : 7,449,869 B2  
APPLICATION NO. : 10/931725  
DATED               : November 11, 2008  
INVENTOR(S)       : Piotr Markowski Page 1 of 1

It is certified that error appears in the above-identified patent and that said Letters Patent is hereby corrected as shown below:

Column 6, Line 31, delete "ND converter" and substitute therefor --A/D converter--.

Signed and Sealed this

Sixth Day of January, 2009

JON W. DUDAS  
*Director of the United States Patent and Trademark Office*